US009407157B2

(12) United States Patent  
Gupta et al.

(10) Patent No.: US 9,407,157 B2  
(45) Date of Patent: Aug. 2, 2016

(54) HIGH VOLTAGE DC POWER CONVERSION SYSTEM AND METHOD OF OPERATING THE SAME

(71) Applicant: General Electric Company, Schenectady, NY (US)

(72) Inventors: Ranjan Kumar Gupta, Schenectady, NY (US); Rui Zhou, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 154 days.

(21) Appl. No.: 14/026,737

(22) Filed: Sep. 13, 2013

(65) Prior Publication Data

US 2015/0078046 A1 Mar. 19, 2015

(51) Int. Cl.
| | |
|---|---|
| H02J 1/00 | (2006.01) |
| H02M 7/04 | (2006.01) |
| H02J 3/36 | (2006.01) |
| H02J 3/38 | (2006.01) |
| H02J 1/10 | (2006.01) |
| H02M 1/00 | (2006.01) |

(52) U.S. Cl.
CPC .. *H02M 7/04* (2013.01); *H02J 3/36* (2013.01); *H02J 3/386* (2013.01); *H02J 1/102* (2013.01); *H02M 2001/0077* (2013.01)

(58) Field of Classification Search
CPC ............. H02J 3/32; H02J 3/383; H02J 1/102; H02M 7/10; H02M 1/36
USPC ........ 307/21, 39, 40, 43, 52, 63, 153; 363/17, 363/34, 37, 40, 41, 71, 132
See application file for complete search history.

(56) References Cited

U.S. PATENT DOCUMENTS

| | | | | |
|---|---|---|---|---|
| 5,321,598 A | * | 6/1994 | Moran | ...................... H02J 3/01 323/207 |
| 7,962,249 B1 | * | 6/2011 | Zhang | ...................... H02J 3/383 307/82 |
| 8,018,083 B2 | | 9/2011 | Larsen et al. | |
| 8,138,620 B2 | * | 3/2012 | Wagoner | ............. H02M 5/4585 290/44 |

(Continued)

FOREIGN PATENT DOCUMENTS

| | | |
|---|---|---|
| EP | 2395648 A2 | 12/2011 |
| WO | 2009155986 A1 | 12/2009 |
| WO | 20110092302 A2 | 8/2011 |

OTHER PUBLICATIONS

Ahmed, et al., "Offshore Wind Park Connection to an HVDC Platform, without using an AC Collector Platform", Master of Science Programme in Wind Power Project Management, Department of Wind Energy, Gotland University, Sweden, Jun. 2012.

(Continued)

*Primary Examiner* — Rajnikant Patel  
(74) *Attorney, Agent, or Firm* — John P. Darling (57) ABSTRACT

A fraction rated conversion system for coupling a plurality of high voltage direct current (HVDC) power strings in parallel to an HVDC transmission system includes at least one fraction rated power converter coupled to the plurality of HVDC power strings and at least one capacitive device coupled to the at least one fraction rated power converter. The at least one fraction rated power converter and the at least one capacitive device regulate a differential voltage across each HVDC power string of the plurality of HVDC power strings to be substantially similar to each other.

20 Claims, 3 Drawing Sheets

(56) References Cited

U.S. PATENT DOCUMENTS

| | | | |
|---|---|---|---|
| 8,264,094 B2 | 9/2012 | Rivas et al. | |
| 8,345,457 B2 * | 1/2013 | Asplund | H02J 3/36 363/125 |
| 8,373,307 B2 | 2/2013 | Sihler et al. | |
| 8,446,042 B2 | 5/2013 | Bundschuh et al. | |
| 8,619,446 B2 * | 12/2013 | Liu | H02M 1/12 363/71 |
| 8,760,122 B2 * | 6/2014 | Demetriades | H02J 3/32 320/107 |
| 8,866,334 B2 * | 10/2014 | Donnelly | H02J 1/10 290/2 |
| 8,872,552 B2 * | 10/2014 | Asam | H03K 19/018521 327/108 |
| 8,884,465 B2 * | 11/2014 | Sarhan | H02M 1/32 307/77 |
| 2012/0136494 A1 | 5/2012 | Kirchner et al. | |
| 2012/0146423 A1 | 6/2012 | Bodewes et al. | |
| 2012/0187680 A1 | 7/2012 | Spooner et al. | |
| 2012/0327693 A1 | 12/2012 | Cousineau et al. | |
| 2013/0128629 A1 | 5/2013 | Clare et al. | |

OTHER PUBLICATIONS

Flo, R.A., "Configuration of large offshore wind farms", Master of Science in Energy and Environment, Norwegian University of Science and Technology, Department of Electrical Power Engineering, Norway, Jun. 2009.

Hassan et al.,"Review of Control Methods for HVDC Transmission Systems", Department of Electrical, Computer and Systems Engineering, Rensselaer Polytechnic Institute, Troy, NY, USA, 2013.

European Search Report and Written Opinion issued in connection with corresponding EP Application No. 14183608.0-1809 dated Mar. 3, 2015.

Yang et al., "Power quality controller based on hybrid modular multilevel converter", Industrial Electronics (ISIE), IEEE International Symposium on, IEEE, pp. 1997-2012, May 28, 2012.

* cited by examiner

HIGH VOLTAGE DC POWER CONVERSION SYSTEM AND METHOD OF OPERATING THE SAME

STATEMENT REGARDING FEDERALLY SPONSORED RESEARCH & DEVELOPMENT

This invention was made with Government support under contract number DE-AR0000224 awarded by the Advanced Research Projects Agency-Energy (ARPA-E). The Government may have certain rights in this invention.

BACKGROUND

The field of the disclosure relates generally to high voltage direct current (HVDC) transmission systems and, more particularly, to electric power conversion systems and their methods of operation.

At least some known electric power generation facilities are physically positioned in a remote geographic region or in an area where physical access is difficult. One example includes power generation facilities geographically located in rugged and/or remote terrain, for example, mountainous hillsides, extended distances from the customers, and off-shore, e.g., off-shore wind turbine installations. More specifically, these wind turbines may be physically nested together in a common geographic region to form a wind turbine farm and are electrically coupled to a common alternating current (AC) collector system. Many of these known wind turbines and wind turbine farms are coupled to AC transmission systems through a power converter and a power transformer. Many of the known power converters are a power conversion assembly, or system, electrically coupled to the AC collector system through the power transformer. Such known power conversion assemblies include a rectifier portion that converts the AC generated by the power generation facilities to direct current (DC) and an inverter portion that converts the DC to AC of a predetermined frequency and voltage amplitude.

Some of these known AC collector systems are further coupled to a high voltage DC (HVDC) transmission system through another power transformer and a portion of a separated power conversion assembly, or system. In such configurations, the rectifier portion of the separated power conversion assembly is positioned in close proximity to the associated AC collector systems and the inverter portion of the separated full power conversion assembly is positioned in a remote facility, such as a land-based facility. Such rectifier and inverter portions are typically electrically connected via submerged HVDC electric power cables that at least partially define the HVDC transmission system. Also, at least some known HVDC transmission systems are coupled to DC loads that do not require an inverter portion of AC conversion. Such known AC-to-DC-to-AC power conversion/AC collection/AC-to-DC conversion/HVDC transmission configurations are relatively simply to implement. However, the large number of AC-to-DC-to-AC power convertors significantly increases the costs of construction and maintenance of such configurations.

Similarly, in a second known configuration, a plurality of wind turbines and/or wind turbine farms are coupled to a common DC collection system through a plurality of electric power converters that include an AC-to-DC converter for rectification and a DC-to-DC converter directly coupled to the AC-to-DC converter for voltage boosting and regulation. The common DC collection system is coupled to a HVDC transmission system through another a DC-to-DC converter for further boosting of the DC voltage for long range transmission. Again, the large number of DC-to-DC power convertors significantly increases the costs of construction and maintenance of such configurations.

A third known configuration includes a plurality of wind turbines and/or wind turbine farms directly coupled to a HVDC transmission system through an associated AC-to-DC converter for rectification. The plurality of AC-to-DC converters are distributed into a plurality of strings where the converters in each string are coupled in series, and the strings are coupled to the HVDC transmission system in parallel. Such configurations facilitate high transmission efficiency without the added costs of booster converters. However, the voltages across each of the individual strings must be maintained within a narrow tolerance band to mitigate voltage mismatches and current imbalances between the strings. Maintaining such narrow tolerance bands is exceptionally difficult with the variations in voltage generation typically associated with renewable energy resources, such as wind turbines.

BRIEF DESCRIPTION

In one aspect, a fraction rated conversion system for coupling a plurality of high voltage direct current (HVDC) power strings in parallel to an HVDC transmission system is provided. The system includes at least one fraction rated power converter coupled to a plurality of HVDC power strings and at least one capacitive device coupled to the at least one fraction rated power converter. The at least one fraction rated power converter and the at least one capacitive device regulate a differential voltage across each HVDC power string of the plurality of HVDC power strings to be substantially similar to each other.

In a further aspect, an electric power conversion system coupled to a high voltage direct current (HVDC) transmission system is provided. The electric power conversion system includes a first HVDC transmission conduit having a first polarity and a second HVDC transmission conduit having a second polarity. The electric power conversion system also includes a plurality of HVDC power strings extending in parallel between the first HVDC transmission conduit and the second HVDC transmission conduit. The electric power conversion system also includes a fraction rated conversion system including at least one fraction rated power converter coupled to the plurality of HVDC power strings. The fraction rated conversion system also includes at least one capacitive device coupled to the at least one fraction rated power converter. The at least one fraction rated power converter and the at least one capacitive device to regulate a differential voltage across each HVDC power string of the plurality of HVDC power strings to be substantially similar to each other.

In another aspect, a method of operating an electric power conversion system is provided. The electric power conversion system is coupled to a high voltage direct current (HVDC) transmission system. The electric power conversion system includes a first HVDC transmission conduit having a first polarity and a second HVDC transmission system having a second polarity. The system also includes a plurality of HVDC power strings extending in parallel between the first HVDC transmission conduit and the second HVDC transmission conduit. The system also includes a fraction rated conversion system including at least one fraction rated power converter coupled to the plurality of HVDC power strings and at least one capacitive device coupled to the at least one fraction rated power converter. The method includes sensing a differential voltage value across each of the HVDC power strings, thereby determining a plurality of differential voltage values. The method also includes comparing the plurality of differential voltage values to a predetermined reference differential voltage value. The method further includes regulating at least one differential voltage value such that the differential voltage values sensed across each of the HVDC power strings are substantially similar each other.

DRAWINGS

These and other features, aspects, and advantages of the present invention will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits (none shown in FIG. 1), and these terms are used interchangeably herein.

Further, as used herein, the terms "software" and "firmware" are interchangeable, and include any computer program stored in memory for execution by personal computers, workstations, clients and servers.

Moreover, as used herein, the term "non-transitory computer-readable media" includes all tangible, computer-readable media, such as a firmware, floppy disk, CD-ROMs, DVDs and another digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The electric power conversion systems for HVDC transmission systems described herein provide a cost-effective method for transmitting HVDC power. The embodiments described herein facilitate transmitting HVDC power across relatively large distances while facilitating lower capital costs by substantially eliminating a need for full power converters and DC voltage booster converters. More specifically, the embodiments described herein use a single fraction rated power converter coupled to each parallel string of AC-to-DC converters to facilitate maintaining a substantially constant and equal voltage across each string.

Figure 1:
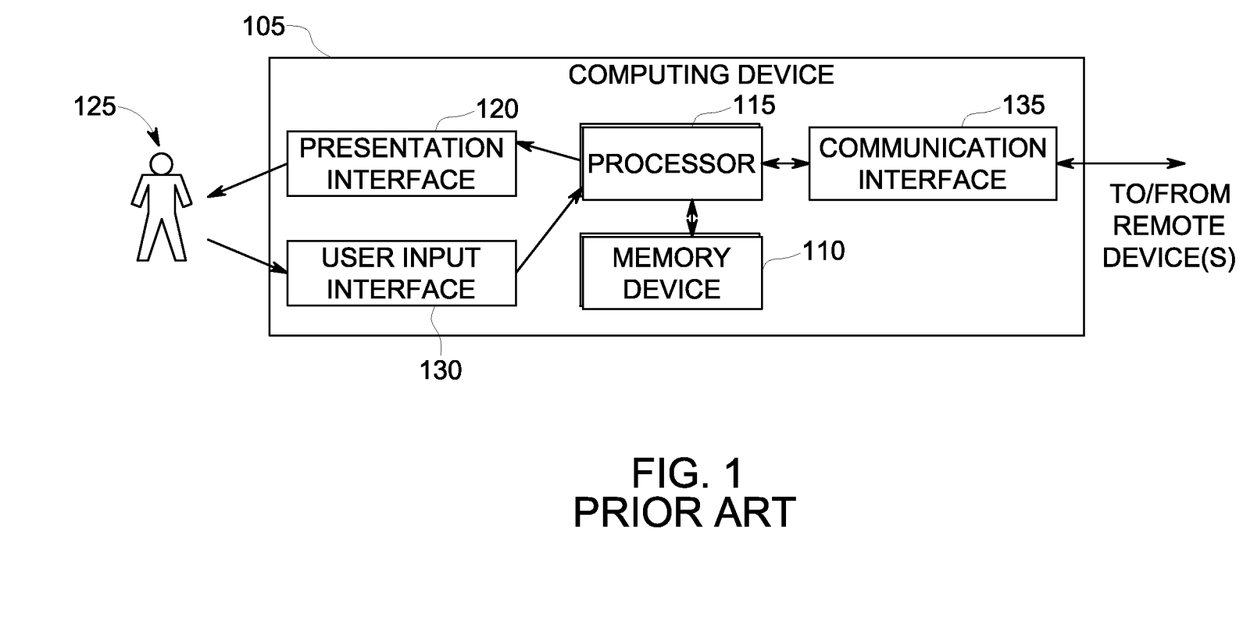
FIG. 1 is a block diagram of an exemplary computing device.

FIG. 1 is a block diagram of an exemplary computing device 105 that may be used to perform monitoring and/or control of a high voltage direct current (HVDC) transmission system and, more specifically, an electric power conversion system (neither shown in FIG. 1). More specifically, computing device 105 monitors and/or controls any piece of equipment, any system, and any process associated with an electric power conversion system and a HVDC transmission system, e.g., without limitation, power converters and monitoring devices (neither shown in FIG. 1). Computing device 105 includes a memory device 110 and a processor 115 operatively coupled to memory device 110 for executing instructions. In some embodiments, executable instructions are stored in memory device 110. Computing device 105 is configurable to perform one or more operations described herein by programming processor 115. For example, processor 115 may be programmed by encoding an operation as one or more executable instructions and providing the executable instructions in memory device 110. In the exemplary embodiment, memory device 110 is one or more devices that enable storage and retrieval of information such as executable instructions and/or other data. Memory device 110 may include one or more computer readable media.

Memory device 110 may be configured to store operational measurements including, without limitation, real-time and historical vibration values, and/or any other type data. Also, memory device 110 includes, without limitation, sufficient data, algorithms, and commands to facilitate monitoring and control of the components within an associated electric power conversion system.

In some embodiments, computing device 105 includes a presentation interface 120 coupled to processor 115. Presentation interface 120 presents information, such as a user interface and/or an alarm, to a user 125. In some embodiments, presentation interface 120 includes one or more display devices. In some embodiments, presentation interface 120 presents an alarm associated with the HVDC transmission system and associated electric power conversion system being monitored, such as by using a human machine interface (HMI) (not shown in FIG. 1). Also, in some embodiments, computing device 105 includes a user input interface 130. In the exemplary embodiment, user input interface 130 is coupled to processor 115 and receives input from user 125.

A communication interface 135 is coupled to processor 115 and is configured to be coupled in communication with one or more other devices, such as a sensor or another computing device 105, and to perform input and output operations with respect to such devices while performing as an input channel. Communication interface 135 may receive data from and/or transmit data to one or more remote devices. For example, a communication interface 135 of one computing device 105 may transmit an alarm to the communication interface 135 of another computing device 105.

Figure 2:
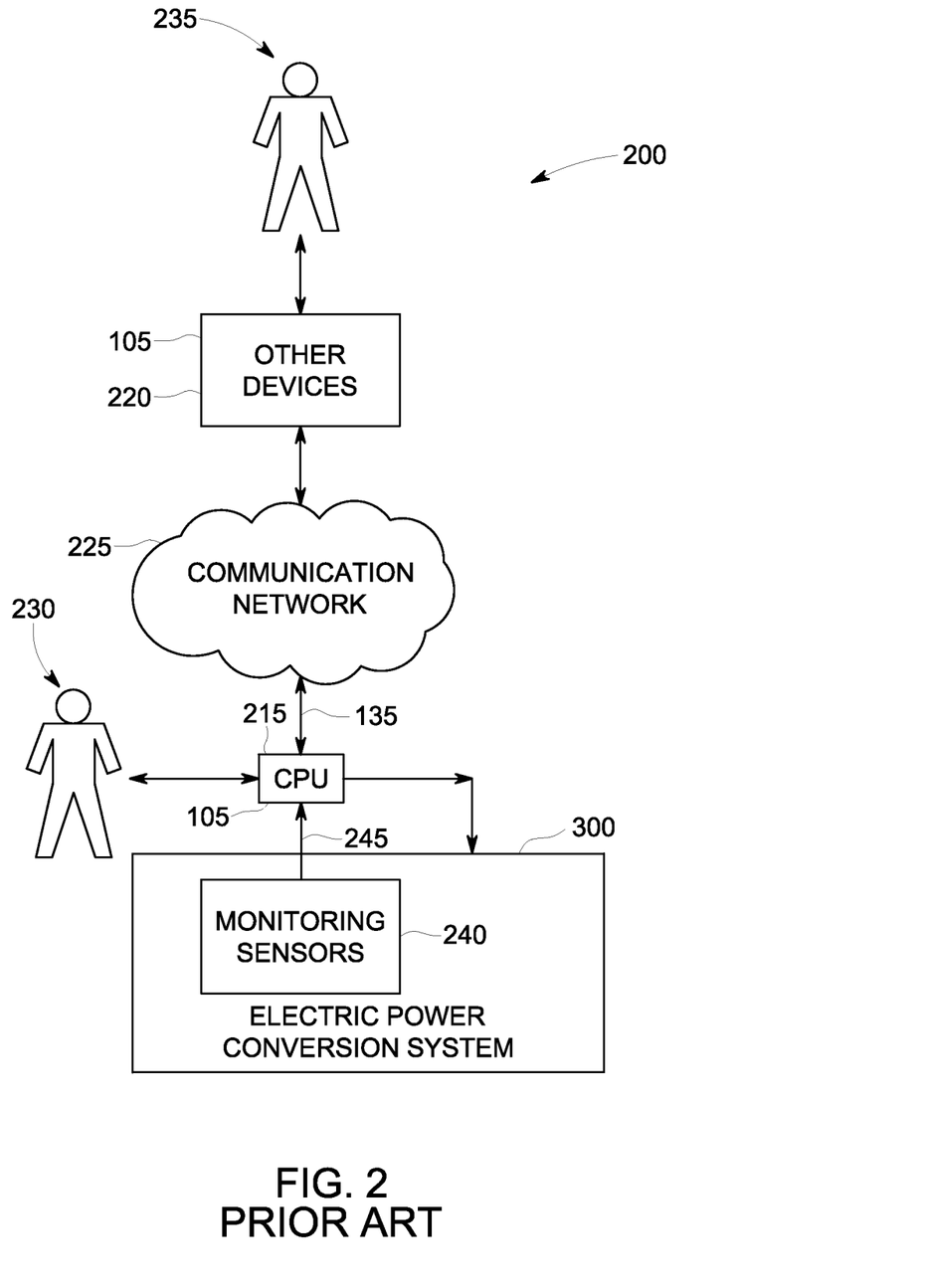
FIG. 2 is block diagram of a portion of an exemplary monitoring and control system that may include the computing device shown in FIG. 1.

FIG. 2 is block diagram of a portion of a monitoring and control system, i.e., in the exemplary embodiment, a Supervisory Control and Data Acquisition (SCADA) system 200 that may be used to monitor and control at least a portion of an electric power conversion system 300. As used herein, the term "SCADA system" refers to any control and monitoring system that may monitor and control electric power conversion system 300 across multiple sites, remote sites, and large distances. In the exemplary embodiment, SCADA system 200 includes at least one central processing unit (CPU) 215 configured to execute monitoring algorithms and monitoring logic. CPU 215 may be coupled to other devices 220 via a communication network 225.

Referring to FIGS. 1 and 2, CPU 215 is a computing device 105. In the exemplary embodiment, computing device 105 is coupled to network 225 via communication interface 135. In an alternative embodiment, CPU 215 is integrated with other devices 220.

CPU 215 interacts with a first operator 230, e.g., without limitation, via user input interface 130 and/or presentation interface 120. In one embodiment, CPU 215 presents information about electric power conversion system 300, such as alarms, to operator 230. Other devices 220 interact with a second operator 235, e.g., without limitation, via user input interface 130 and/or presentation interface 120. For example, other devices 220 present alarms and/or other operational information to second operator 235. As used herein, the term "operator" includes any person in any capacity associated with operating and maintaining electric power conversion system 300, including, without limitation, shift operations personnel, maintenance technicians, and facility supervisors.

In the exemplary embodiment, electric power conversion system 300 includes one or more monitoring sensors 240 coupled to CPU 215 through at least one input channel 245. Monitoring sensors 240 collect operational measurements including, without limitation, AC and DC voltages and currents generated within and transmitted through electric power conversion system 300. Monitoring sensors 240 repeatedly, e.g., periodically, continuously, and/or upon request, transmit operational measurement readings at the time of measurement. CPU 215 receives and processes the operational measurement readings. Such data is transmitted across network 225 and may be accessed by any device capable of accessing network 225 including, without limitation, desktop computers, laptop computers, and personal digital assistants (PDAs) (neither shown). In alternative embodiments, CPU 215 includes, without limitation, sufficient data, algorithms, and commands to facilitate control of the DC current transmission through electric power conversion system 300.

Figure 3:
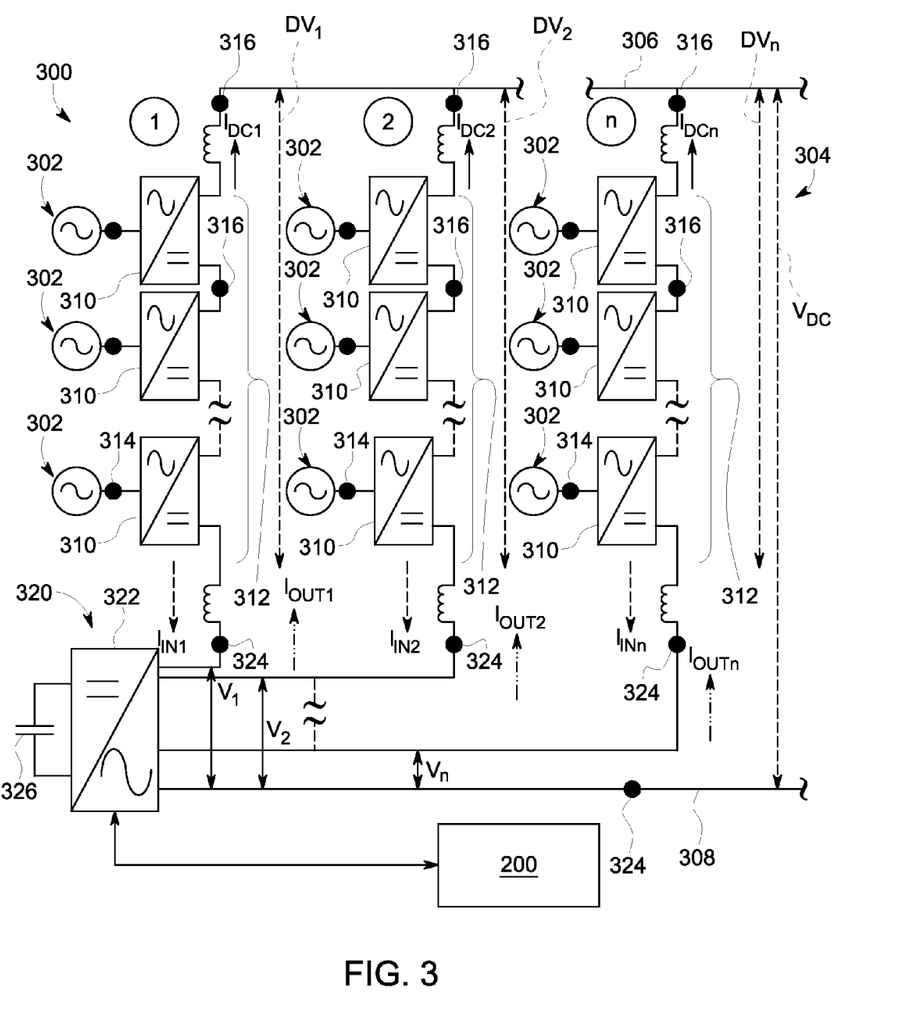
FIG. 3 is a schematic diagram of an exemplary electric power conversion system that may be monitored and controlled using the system shown in FIG. 2.

FIG. 3 is a schematic diagram of electric power conversion system 300 that may be monitored and controlled using SCADA system 200 (shown in FIG. 2). In the exemplary embodiment, electric power conversion device 300 couples a plurality of alternating current (AC) electric power generation devices 302 to a HVDC electric power transmission grid, or system 304 that may have portions thereof (not shown) positioned hundreds, or thousands, of kilometers from devices 302 across rugged and/or remote terrain, e.g., mountainous hillsides, large bodies of water, and extended distances from users. HVDC electric power transmission system 304 includes a first transmission conduit 306 configured to be energized with a first polarity and a second transmission conduit 308 configured to be energized with a second polarity that is opposite the first polarity. Therefore, system 304 is a unipolar system with a predetermined system voltage $V_{DC}$ between conduits 306 and 308.

In the exemplary embodiment, AC electric power generation devices 302 may be positioned off-shore, i.e., devices 302 may be off-shore wind farms. Alternatively, AC electric power generation devices 302 may include any type of renewable electric power generation system including, for example, and without limitation, solar power generation systems, fuel cells, thermal power generators, geothermal generators, hydropower generators, and/or any other device that generates power from renewable energy sources. Alternatively, AC electric power generation devices 302 may include any type of non-renewable electric power generation system including, for example, and without limitation, coal- and oil-fired facilities, gas turbine engines, nuclear power generation facilities, diesel generators, gasoline generators, and/or any other device that generates power from non-renewable energy sources. Moreover, any number of electric power generation devices 302 may be used. Also, at least one of AC electric power generation devices 302 may include an AC power grid. As such, AC electric power generation devices 302 may include electric power loads.

In the exemplary embodiment, electric power conversion system 300 includes a plurality of power converters 310 distributed into groups 312 of power converters 310 to at least partially define a plurality of, i.e., an integer n HVDC power strings that includes a first HVDC power strong 1, a second HVDC power string 2, through an $n^{th}$ HVDC power string n. Each power converter 310 is coupled to an AC electric power generation device 302 through an AC terminal 314. While most AC power generation devices 302 are three-phase systems, only one phase is shown in FIG. 3 for clarity. Each power converter 310 is coupled to HVDC electric power transmission system 304 through a plurality of DC terminals 316. Therefore, power converters 310 are coupled in parallel on the AC side and are coupled in series on the DC side. Power converters 310 are AC-to-DC converters, i.e., rectifiers.

Electric power conversion system 300 also includes a fraction rated conversion system 320 for coupling HVDC power strings 1 through n in parallel to HVDC transmission system 304. Faction rated conversion system 320 includes at least one fraction rated power converter 322 (only one shown) coupled to HVDC power strings 1 through n and to second HVDC transmission conduit 308 through DC terminals 324. Fraction rated power converter 322 is any bi-directional power converter configured to convert AC to DC, DC to DC, or DC to AC to enable operation of faction rated conversion system 320 as described herein. Such bi-directional power converters include, without limitation, multi-level converters, modular multi-level converters, and isolated converters through high-frequency AC links. Fraction rated power converter 320 is coupled to SCADA system 200.

Fraction rated conversion system 320 also includes at least one capacitive device 326 coupled to fraction rated power converter 320. In the exemplary embodiment, capacitive device 326 is a "floating" capacitor, i.e., the electric charge on capacitive device 326 is maintained at a predetermined, substantially constant voltage value. Also, in the exemplary embodiment, capacitive device may be a combination of distributed capacitance throughout electric power conversion system 300 that is configured and connected to be compatible with power converter 322. However, for clarity, a single capacitive device 326 is shown.

In the exemplary embodiment, SCADA system 200 is operatively coupled to fraction rated power converter 322. SCADA system 200 includes a plurality of monitoring sensors 240 that include, without limitation, voltage monitoring sensors and current monitoring sensors. Fraction rated conversion system 320 and SCADA 200 may also include any other sensing devices that enable operation of fraction rated conversion system 320 as described herein. Monitoring sensors 240 are configured to transmit real-time current and voltage monitoring information to SCADA system 200. Any positioning and configuration of monitoring sensors 240 that enables operation of fraction rated conversion system 320 as described herein may be used. Moreover, fraction rated conversion system 320 is configured to receive commands from SCADA system 200 and transmit status and feedback information to SCADA system 200.

Alternatively, any control system architecture that enables operation of fraction rated conversion system 320 and SCADA system 200 as described herein may be used. For example, and without limitation, fraction rated conversion system 320 may include at least one controller (not shown) that includes at least one processor (not shown). As used herein, the terms "controller", "control system", and "processor" include any programmable system including systems and microcontrollers, reduced instruction set circuits, application specific integrated circuits, programmable logic circuits, and any other circuit capable of executing the functions described herein. The above examples are exemplary only, and thus are not intended to limit in any way the definition and/or meaning of the term processor. Moreover, each controller may include sufficient processing capabilities to execute support applications including, without limitation, those for SCADA system 200. Each associated controller may be coupled to associated monitoring sensors 240 and may also be coupled to and/or a portion of SCADA system 200.

SCADA system 200 receives electric current values $I_{DC1}$ through $I_{DCn}$ for each of HVDC power strings 1 through n, respectively, differential voltage values $DV_1$ through $DV_n$, for each of strings 1 through n, respectively, and the voltage $V_{DC}$ of HVDC electric power transmission system 304 through monitoring sensors 240 (shown in FIG. 2). SCADA system 200 compares measured values of differential voltages $DV_1$ through $DV_n$ to a reference value, e.g., the measured value of voltage $V_{DC}$ or a predetermined value for voltage $V_{DC}$, a determines a difference between them.

Fraction rated power converter 322 and capacitive device 326 cooperate to generate a supplemental voltage $V_1$ through $V_n$ for each of HVDC power strings 1 through n, respectively. Values for such supplemental voltages $V_1$ through $V_n$ are determined by SCADA system 200 as a function of the calculated differences between $V_{DC}$ and voltages $DV_1$ through $DV_n$. SCADA system 200 commands fraction rated conversion system 320 to induce supplemental voltages $V_1$ through $V_n$ that will be added to measured voltages $DV_1$ through $DV_n$, respectively, to substantially equalize measured values of differential voltages $DV_1$ through $DV_n$ to that of voltage $V_{DC}$. A sum of all supplemental voltages $V_1$ through $V_n$ induced by fraction rated conversion system 320 is approximately zero.

In addition, fraction rated power converter 322 receives a portion of the current transmitted through each HVDC power string 1 through n, i.e., $I_{IN1}$ through $I_{INn}$, respectively. As fraction rated conversion system 320 equalizes voltages in each HVDC power string 1 through n such that $DV_1$+ $V_1$=$DV_2$+$V_2$= ... $DV_n$+$V_n$, SCADA system 200 commands fraction rated power converter 322 to circulate DC currents $I_{IN1}$ through $I_{INn}$, i.e., to redistribute the DC current as DC currents $I_{OUT1}$ through $I_{OUTn}$, thereby regulating DC currents transmitted through each HVDC power string 1 through n such that the currents in each of strings 1 through n are substantially equalized.

In operation, AC electric power generation devices 302 and their associated power converters 310 are placed into service with HVDC electric power transmission system 304. In the exemplary embodiment, $V_{DC}$ is established at approximately 310 kV and capacitive device 326 is charged to approximately 30 kV. Measured voltages $DV_1$, $DV_2$, and $DV_n$ have values of approximately 300 kV, 330 kV, and 300 kV, respectively. Fraction rated power converter 322 and capacitive device 326 cooperate to generate supplemental voltages $V_1$, $V_2$, and $V_n$ for each of HVDC power strings 1 through n, respectively, are 10 kV, −20 kV, and 10 kV, respectively, as determined by SCADA system 200. SCADA system 200 commands fraction rated conversion system 320 to induce supplemental voltages $V_1$ through $V_n$ that will be added to measured voltages $DV_1$ through $DV_n$, respectively, to substantially equalize measured values of differential voltages $DV_1+V_1$ through $DV_n+V_n$, to that of voltage $V_{DC}$, i.e., 310 kV. A sum of all supplemental voltages $V_1$ through $V_n$ induced by fraction rated conversion system 320 is approximately zero.

In the exemplary embodiment, electric power generation devices 302, including any loads coupled thereto, are AC-based. Such AC-based systems facilitate connection to renewable AC sources, e.g., wind turbines, and non-renewable AC sources, e.g., gas turbine engines. Alternatively, devices 302 may be DC-based electric power generation devices and loads. In such alternative embodiments, a DC-to-DC power converter is coupled to the DC-based electric power generation devices and loads through a DC terminal. Such DC-based systems facilitate connection to renewable DC sources, e.g., solar power generation systems. Also, in such DC-based systems, fraction rated power converter 322 and capacitive device 326 generate supplemental voltages $V_1$, $V_2$, and $V_n$ for each of HVDC power strings 1 through n, respectively, as determined by SCADA system 200 and as described above.

The above-described electric power conversion systems for HVDC transmission systems provide a cost-effective method for transmitting HVDC power. The embodiments described herein facilitate transmitting HVDC power across relatively large distances while facilitating lower capital costs by substantially eliminating a need for full power converters and DC voltage booster converters. More specifically, the embodiments described herein use a single fraction rated power converter coupled to each parallel string of AC-to-DC converters to facilitate maintaining a substantially constant and equal voltage across each string.

An exemplary technical effect of the methods, systems, and apparatus described herein includes at least one of: (a) substantially eliminating a need for full power converters and DC voltage booster converters in electric power conversion systems associated with HVDC transmission systems and renewable energy sources; and (b) using a single fraction rated power converter coupled to each parallel string of AC-to-DC converters to facilitate maintaining a substantially constant and equal voltage across each string of an electric power conversion systems associated with HVDC transmission systems and renewable energy sources.

Exemplary embodiments of electric power conversion systems for coupling power generation facilities and a HVDC transmission system, and methods of operating such systems and devices are not limited to the specific embodiments described herein, but rather, components of systems and/or steps of the methods may be utilized independently and separately from other components and/or steps described herein. For example, the methods may also be used in combination with other systems requiring HVDC transmission and power conversion and the associated methods, and are not limited to practice with only the HVDC transmission systems and methods as described herein. Rather, the exemplary embodiment can be implemented and utilized in connection with many other DC transmission applications that are currently configured to transmit and receive electric power, e.g., and without limitation, DC distribution systems in remote areas and industrial facilities.

Although specific features of various embodiments of the invention may be shown in some drawings and not in others, this is for convenience only. In accordance with the principles of the invention, any feature of a drawing may be referenced and/or claimed in combination with any feature of any other drawing.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electric power conversion system coupled to a high voltage direct current (HVDC) transmission system, said electric power conversion system comprising:
   a first HVDC transmission conduit having a first polarity;
   a second HVDC transmission conduit having a second polarity;
   a plurality of HVDC power strings extending in parallel between said first HVDC transmission conduit and said second HVDC transmission conduit;
   a fraction rated conversion system comprising:
      at least one fraction rated power converter coupled to said plurality of HVDC power strings; and
      at least one capacitive device coupled to said at least one fraction rated power converter, said at least one fraction rated power converter and said at least one capacitive device regulate a differential voltage across each HVDC power string of said plurality of HVDC power strings to be substantially similar to each other.

2. The electric power conversion system in accordance with claim 1 further comprising a plurality of power converters, each of said power converters coupled to one of an alternating current (AC) power source and a DC power source.

3. The electric power conversion system in accordance with claim 1 further comprising a plurality of power converters, each of said power converters coupled to one HVDC power string of said plurality of HVDC power strings.

4. The electric power conversion system in accordance with claim 3, wherein at least one HVDC power string of said plurality of HVDC power strings comprises a group of said plurality of power converters coupled in series.

5. The electric power conversion system in accordance with claim 1, wherein said at least one fraction rated power converter is configured to receive at least a portion of DC current transmitted through each HVDC power string of said plurality of HVDC power strings and regulate DC current transmitted through each of said HVDC power strings.

6. The electric power conversion system in accordance with claim 1, wherein said at least one fraction rated power converter is configured to circulate DC current received from each HVDC power string of said plurality of HVDC power strings to regulate DC current transmitted through each of said HVDC power strings to be substantially similar to each other.

7. The electric power conversion system in accordance with claim 1, wherein said at least one capacitive device and said at least one fraction rated power converter are configured to induce a supplemental voltage to each HVDC power string of said plurality of HVDC power strings.

8. The electric power conversion system in accordance with claim 1, wherein said at least one fraction rated power converter is configured to induce a supplemental voltage for each HVDC power string of said plurality of HVDC power strings, such induced supplemental voltages have predetermined values such that when added to existing voltages induced across said plurality of HVDC power strings the total voltages induced across each of said HVDC power strings are substantially similar to each other.

9. The electric power conversion system in accordance with claim 8, wherein the sum of all supplemental voltages induced by said at least one fraction rated power converter is approximately zero.

10. A method of operating an electric power conversion system, the electric power conversion system coupled to a high voltage direct current (HVDC) transmission system, the electric power conversion system including a first HVDC transmission conduit having a first polarity and a second HVDC transmission system having a second polarity, a plurality of HVDC power strings extending in parallel between the first HVDC transmission conduit and the second HVDC transmission conduit, and a fraction rated conversion system including at least one fraction rated power converter coupled to the plurality of HVDC power strings and at least one capacitive device coupled to the at least one fraction rated power converter, said method comprising:
   sensing a differential voltage value across each of the HVDC power strings, thereby determining a plurality of differential voltage values;
   comparing the plurality of differential voltage values to a predetermined reference differential voltage value; and
   regulating at least one differential voltage value such that the differential voltage values sensed across each of the HVDC power strings are substantially similar to each other.

11. The method in accordance with claim 10 further comprising:

sensing, a DC current value through each of the HVDC power strings, wherein regulating at least one differential voltage value comprises regulating DC current transmitted through at least one HVDC power string;

transmitting at least a portion of DC current transmitted through each HVDC power string to the at least one fraction rated power converter; and circulating DC current received from each HVDC power string to regulate DC current transmitted through each HVDC power string to be substantially similar to each other.

12. The method in accordance with claim 10, wherein regulating at least one differential voltage value comprises inducing a supplemental voltage on at least one HVDC power string.

13. The method in accordance with claim 12, wherein inducing a supplemental voltage on at least one HVDC power string comprises:

inducing a supplemental voltage for each HVDC power string, each induced supplemental voltage has a determined value related to the comparison of each differential voltage value for each HVDC power string to the predetermined reference differential voltage value; and adding each induced supplemental voltage to the sensed differential voltage value across each associated HVDC power string.

14. The method in accordance with claim 12, wherein inducing a supplemental voltage for each HVDC power string comprises inducing a plurality of supplemental voltages having values that are at least one of positive, negative, and zero, such that the sum of all supplemental voltages induced by the at least one fraction rated power converter is approximately zero.

15. The electric power conversion system in accordance with claim 1, wherein the at least one fraction rated power converter comprises a bi-directional power converter.

16. The electric power conversion system in accordance with claim 4, wherein each of said group of said plurality of power converters is an AC-to-DC converter and is coupled to an AC electric power generation device such that said group of said plurality of power converters are coupled in parallel on the AC side of each of said group of said plurality of power converters.

17. The electric power conversion system in accordance with claim 1, wherein the said at least one capacitive device is maintained at a predetermined, substantially constant voltage.

18. The electric power conversion system in accordance with claim 7, further comprising:

a supervisory control and data acquisition system configured to receive electric current values for each of the plurality of HVDC power strings and command the fraction rated conversion system to induce the supplemental voltages.

19. The electric power conversion system in accordance with claim 18, wherein the supervisory control and data acquisition system measures values of differential voltages of each HVDC power string and compares the measured values of differential voltages to a predetermined voltage of a HVDC electric power transmission grid comprising the first and second HVDC transmission conduits.

20. The electric power conversion system in accordance with claim 19, wherein a sum of the supplemental voltages that the supervisory control and data acquisition system commands the fraction rated conversion system to induce is approximately zero.

* * * * *